United States Patent
Kang

(10) Patent No.: US 9,773,226 B2
(45) Date of Patent: Sep. 26, 2017

(54) SYSTEM AND METHOD FOR SERVICING CUSTOMIZED MOBILE CONTENT

(75) Inventor: Soon Taek Kang, Gyeonggi-do (KR)

(73) Assignee: LG CNS CO., LTD., Seoul (KR)

( * ) Notice: Subject to any disclaimer, the term of this patent is extended or adjusted under 35 U.S.C. 154(b) by 1189 days.

(21) Appl. No.: 13/306,371

(22) Filed: Nov. 29, 2011

(65) Prior Publication Data

US 2012/0303517 A1    Nov. 29, 2012

(30) Foreign Application Priority Data

Feb. 10, 2011    (KR) .................. 10-2011-0011952

(51) Int. Cl.
G06Q 10/10    (2012.01)
G06Q 20/08    (2012.01)

(52) U.S. Cl.
CPC .............. *G06Q 10/10* (2013.01); *G06Q 20/08* (2013.01); *G06Q 2220/10* (2013.01); *G06Q 2220/145* (2013.01)

(58) Field of Classification Search
CPC ............... G06C 20/29; G06C 30/0239; G06C 30/0241; G06C 30/0635; G06C 30/0341; G06C 20/3278; G06C 20/352; G06C 20/3675; G06F 2221/2121; G06F 7/725; G06F 8/60; G06F 20/01235; G06F 20/085; G06F 9/45533; G06F 9/45558; G06F 11/0712; G06F 11/727
See application file for complete search history.

(56) References Cited

U.S. PATENT DOCUMENTS

| | | | | |
|---|---|---|---|---|
| 5,416,914 | A  * | 5/1995 | Korngiebel et al. .......... | 711/114 |
| 5,493,419 | A  * | 2/1996 | Jodoin et al. ................ | 358/3.08 |
| 5,892,900 | A  * | 4/1999 | Ginter et al. .................. | 726/26 |
| 8,359,320 | B2 * | 1/2013 | Howcroft .......... | G06F 17/30038 |
| | | | | 707/756 |
| 8,412,926 | B1 * | 4/2013 | Gerraty ............... | H04L 63/0428 |
| | | | | 380/255 |
| 8,775,469 | B2 * | 7/2014 | Kaarela ................... | G06F 21/10 |
| | | | | 705/67 |
| 2002/0006787 | A1 * | 1/2002 | Darby .......................... | 455/419 |
| 2002/0087496 | A1 * | 7/2002 | Stirpe et al. .................... | 706/45 |

(Continued)

FOREIGN PATENT DOCUMENTS

| | | |
|---|---|---|
| FR | 1020050005165 A1 | 7/2006 |
| JP | 2002-259283 | 9/2002 |

(Continued)

*Primary Examiner* — Mamon Obeid
*Assistant Examiner* — Johann Choo
(74) *Attorney, Agent, or Firm* — Madeline F. Schiesser; Keohane & D'Alessandro, PLLC

(57) ABSTRACT

Disclosed are a system and a method for servicing a customized mobile content that can allow a user to easily download and use various mobile contents regardless of a type of his/her own terminal by: verifying user information by using metadata and a template that are stored in advance from information published by a content publishing institution, generating a mobile content suitable for types of the content publishing institution and a user terminal and transmitting the generated mobile content to the user terminal, downloading the mobile content through a program for the mobile content installed in the user terminal, and displaying the downloaded mobile content to the user.

21 Claims, 10 Drawing Sheets

(56) References Cited

U.S. PATENT DOCUMENTS

| | | | |
|---|---|---|---|
| 2003/0126086 A1* | 7/2003 | Safadi | G06F 21/10 |
| | | | 705/51 |
| 2004/0039972 A1* | 2/2004 | Chung | G06Q 30/06 |
| | | | 714/100 |
| 2005/0071662 A1* | 3/2005 | Wada et al. | 713/193 |
| 2005/0091491 A1* | 4/2005 | Lee et al. | 713/167 |
| 2005/0273431 A1* | 12/2005 | Abel | G06Q 20/02 |
| | | | 705/42 |
| 2006/0004830 A1* | 1/2006 | Lora et al. | 707/102 |
| 2006/0191995 A1* | 8/2006 | Stewart | G06F 21/6245 |
| | | | 235/379 |
| 2006/0235723 A1* | 10/2006 | Millard | 705/1 |
| 2006/0236221 A1* | 10/2006 | McCausland | G11B 27/034 |
| | | | 715/201 |
| 2008/0305773 A1* | 12/2008 | Hundscheidt et al. | 455/412.1 |
| 2009/0119757 A1* | 5/2009 | Acuna | G06F 21/6245 |
| | | | 726/5 |
| 2010/0115346 A1* | 5/2010 | Lee | 714/49 |
| 2010/0121673 A1* | 5/2010 | Sakaguchi et al. | 705/9 |
| 2011/0219095 A1* | 9/2011 | Lee et al. | 709/218 |
| 2011/0231819 A1* | 9/2011 | Tanner et al. | 717/123 |
| 2011/0282748 A1* | 11/2011 | Ciurea | 705/14.64 |
| 2012/0030003 A1* | 2/2012 | Herwig | 705/14.38 |
| 2012/0047331 A1* | 2/2012 | Meza et al. | 711/134 |
| 2013/0036048 A1* | 2/2013 | Campos | G06Q 20/36 |
| | | | 705/41 |

FOREIGN PATENT DOCUMENTS

| | | |
|---|---|---|
| KR | 1020060039228 A | 8/2006 |
| KR | 1020070075843 A1 | 2/2009 |
| KR | 1020090041509 A | 4/2009 |
| KR | 1020090118555 A | 11/2009 |
| KR | 1020080103223 A1 | 4/2010 |
| KR | 1020100003730 A | 11/2010 |
| WO | WO 2004090658 A3 * | 2/2005 |

* cited by examiner

SYSTEM AND METHOD FOR SERVICING CUSTOMIZED MOBILE CONTENT

CROSS-REFERENCE TO RELATED APPLICATIONS

This application is based on and claims priority from Korean Patent Application No. 10-2011-0011952, filed on Feb. 10, 2011, with the Korean Intellectual Property Office, the present disclosure of which is incorporated herein in its entirety by reference.

TECHNICAL FIELD

The present disclosure relates to a system and a method for servicing a customized mobile content, and more particularly, to a system and a method for servicing a customized mobile content that can allow a user to easily download and use various mobile contents regardless of a type of his/her own terminal.

BACKGROUND

Diverse companies and governmental institutions (local autonomous entities) provide information materials to users off-line for the purposes of advertising, marketing, promotion, informing/notification, and identification of members or provides some information materials to user terminals through a predetermined program. In this case, for the user to verify various information materials, separate programs should be respectively installed in the user terminals for each of services provided by the diversity of companies and governmental institutions.

No storage where all information materials are incorporated is provided in the companies and the governmental institutions. The user experiences inconvenience in finding and looking for information materials published for himself/herself for each of the diverse companies and governmental institutions through various paths.

When the user loses the user terminal (for example, a cellular phone) or changes his/her own terminal to another terminal, the user needs to contact with each service provider (for example, a plurality of card companies) and receive previously received contents.

The user can verify the published information materials by using only the separate program installed in the user terminal. The companies and the governmental institutions do not provide a storage service to view the same content in a computer, an IPTV, or a smart TV that are possessed by the user. In this regard, the companies and the governmental institutions do not provide even a client program providing the storage service.

Since the companies and the governmental institutions do not provide a function to directly pay a charge statement in a crediter terminal by using a credit card and an account transfer, it is inconvenient for the user to pay off-line and separately check the new updated statement. Publishing systems of companies and governmental institutions do not provide an authorized storage storing function such as an authorized electronic document storage.

SUMMARY

The present disclosure has been made in an effort to provide a system and a method for servicing a customized mobile content that can allow a user to easily download and use various mobile contents regardless of a type of his/her own terminal by verifying user information by using metadata and a template that are stored in advance from an information material published by a content publishing institution, generating a mobile content suitable for types of the content publishing institution and a user terminal and transmitting the generated mobile content to the user terminal, downloading the mobile content through a program for the mobile content installed in the user terminal and displaying the downloaded mobile content to the user.

An exemplary embodiment of the present disclosure provides a system for servicing a customized mobile content, including: a mobile content servicing apparatus verifying a terminal type of a user terminal by using prestored metadata from sent data published from a content publishing server, generating a mobile content by using a prestored template according to the verified terminal type, transmitting a notification message of the generated mobile content, and transmitting the mobile content according to a request for downloading the mobile content; and a user terminal receiving the notification message of the mobile content from the customized mobile content servicing apparatus, downloading the mobile content according to the received notification message of the mobile content, and displaying the downloaded mobile content to a user.

Another exemplary embodiment of the present disclosure provides an apparatus for servicing a customized mobile content, including: a communication interface unit receiving sent data from a content publishing server and transmitting a mobile content notification message and a mobile content to a user terminal; a sent data verifying unit verifying a terminal type of the user terminal by using prestored metadata from the received sent data; a mobile content generating unit generating the mobile content by using a prestored template according to the verified terminal type; a content sending management unit transmitting the generated notification message of the mobile content to the user terminal and transmitting the mobile content according to a request for downloading the mobile content from the user terminal; and a data managing unit storing the received sent data, the user information, the template, and the metadata.

Yet another exemplary embodiment of the present disclosure provides a user terminal for servicing a customized mobile content, including: a transmitting/receiving unit transmitting a downloading request of a mobile content to a customized mobile content servicing apparatus and receiving a mobile content notification message and the mobile content from the customized mobile content servicing apparatus; a content managing unit managing whether a mobile content program is installed and the version of the mobile content program, requesting downloading the mobile content through the mobile content program to the transmitting/receiving unit, and parsing and managing the received mobile content for each classification system in response to the request; a display unit displaying the parsed mobile content to a user; and an input unit receiving data inputted by the user.

Still another exemplary embodiment of the present disclosure provides a method for servicing a customized mobile content, including: a sent data receiving process of receiving sent data from a content publishing server; a sent data verifying process of verifying a terminal type of a user terminal by using prestored metadata from the received sent data; a mobile content generating process of generating a mobile content by using a prestored template according to the verified terminal type; a notification message transmitting process of transmitting a notification message of the generated mobile content to the user terminal; and a mobile content sending process of transmitting the mobile content according to a request for downloading the mobile content from the user terminal.

Still yet another exemplary embodiment of the present disclosure provides a method for servicing a customized mobile content, including: a program verifying process of verifying whether a program for the mobile content is installed and the version of the program; a download requesting process of requesting downloading the mobile content through the verified mobile content program; a mobile content receiving process of receiving and decoding the mobile content in response to the request; a content parsing process of parsing the decoded mobile content for each prestored classification system; and a displaying process of displaying the parsed mobile content to a user.

According to exemplary embodiments of the present disclosure, a user to can easily download and use various mobile contents regardless of a type of his/her own terminal by verifying user information by using metadata and a template that are stored in advance from an information material published by a content publishing institution, generating a mobile content suitable for types of the content publishing institution and a user terminal and transmitting the generated mobile content to the user terminal, downloading the mobile content through a program for the mobile content installed in the user terminal and displaying the downloaded mobile content to the user.

According to exemplary embodiments of the present disclosure, by parsing and outputting mobile contents through a program (for example, a virtual machine or an application) loaded on the user terminal, various users can easily inquire into and manage customized contents suitable for themselves.

According to exemplary embodiments of the present disclosure, content publishing institutions (for example, companies and governmental institutions) directly design (produce) and generate contents through a web portal in addition to using an I/F module between servers and upload information regarding a person who receive the corresponding content in an Excel (CSV file) format to easily request for sending the content.

According to exemplary embodiments of the present disclosure, the content publishing institutions (for example, the companies and the governmental institutions) transmit information by using paper printing or e-mail or process all contents distributed in a type of a plastic card and transmit the processed contents to the user terminal for the purposes of advertising, marketing, promotion, informing/notification, and identification of members, such that the user can possess and use mobile contents in his/her own terminal regardless of communication. Further, a mobile client program is provided to the user terminal to allow the user to systematically classify and use all information for the purpose of advertising, marketing, promotion, informing/notification, and identification of member.

According to exemplary embodiments of the present disclosure, immediateness, effectiveness, and convenience in delivering and using the mobile contents are improved with respect to the user and paper outputting and the number of used plastic cards are reduced to reduce carbon emission.

According to exemplary embodiments of the present disclosure, the user can verify the mobile contents by using the user's PC, IPTV, and smart TV through a storage service of the mobile contents. Further, even when the user terminal is lost or replaced, the previous mobile contents can be downloaded or inquired through the storage service. In addition, in the case where the mobile contents are an important electronic document, the corresponding document is stored in the authorized electronic document storage to store the mobile contents more safely.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Figure 1:
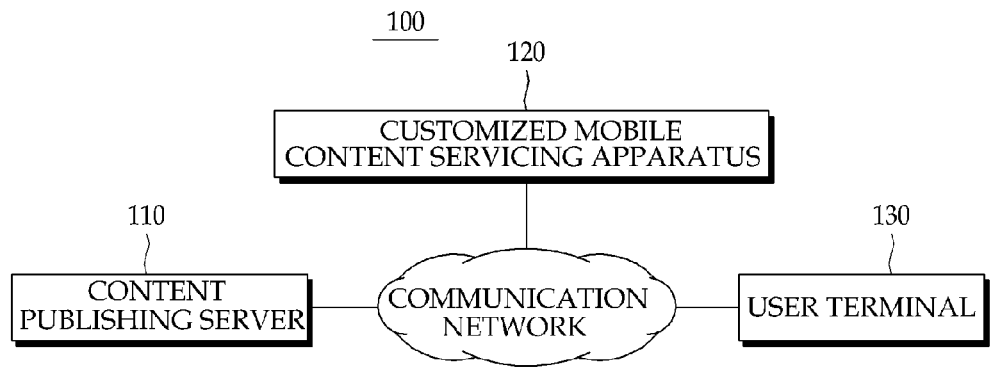
FIG. 1 is a configuration diagram of a system for servicing a customized mobile content according to an exemplary embodiment of the present disclosure.

FIG. 1 is a configuration diagram of a system for servicing a customized mobile content according to an exemplary embodiment of the present disclosure.

As shown in FIG. 1, the customized mobile content servicing system 100 includes a content publishing server 110, a customized mobile content servicing apparatus 120, and a user terminal 130.

The content publishing server 110 publishes an information material which a content publishing institution sends for the purpose of advertising, marketing, promotion, informing/notification, or identification of member, and extracts sent data from the published information material to transmit the extracted data to the customized mobile content servicing apparatus 120.

The customized mobile content servicing apparatus 120 verifies a type of the user terminal 130 from the sent data published by the content publishing server 110 by using prestored metadata. The customized mobile content servicing apparatus 120 generates a mobile content by using a prestored template according to the verified terminal type. Subsequently, the customized mobile content servicing apparatus 120 transmits a notification message of the generated mobile content and transmits the mobile content according to a request for downloading the mobile content from the user terminal 130.

The user terminal 130 receives the notification message of the mobile content from the customized mobile content servicing apparatus 120, and downloads the mobile content according to the received notification message of the mobile content and displays the downloaded mobile content to a user. The user terminal 130 may be a cellular phone, a PC, an IPTV, or a smart TV. The user may inquire into or download the mobile content through the user terminal 130.

Figure 2:
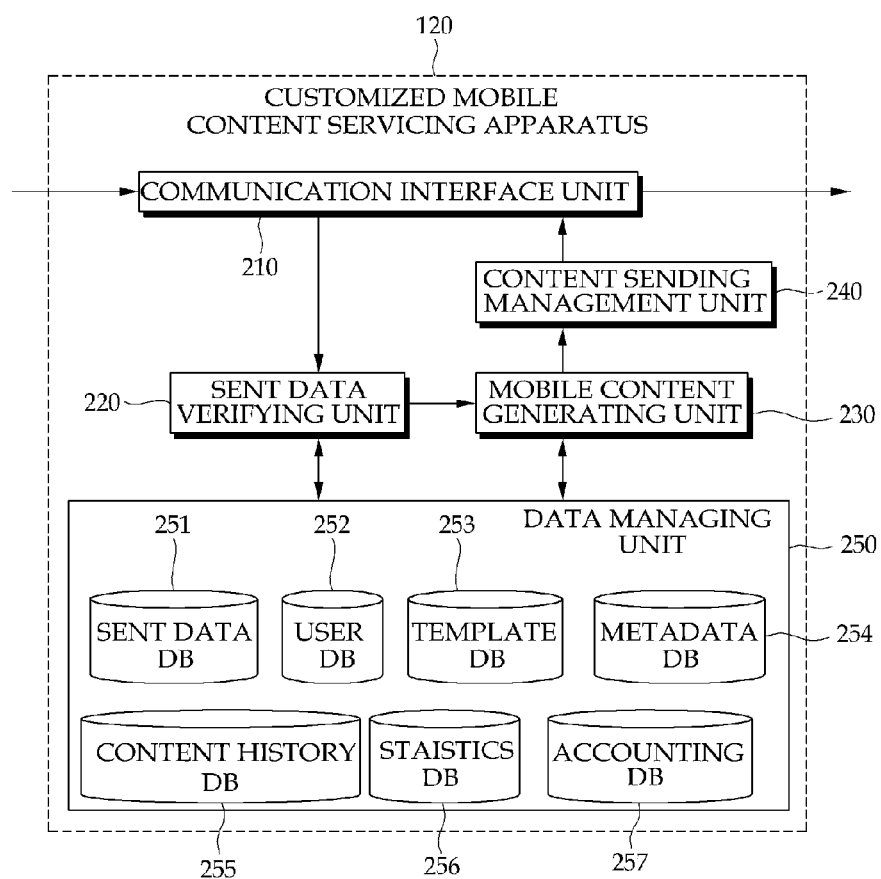
FIG. 2 is a configuration diagram of an apparatus for servicing a customized mobile content of FIG. 1 according to an exemplary embodiment of the present disclosure.

FIG. 2 is a configuration diagram of an apparatus for servicing a customized mobile content of FIG. 1 according to an exemplary embodiment of the present disclosure.

As shown in FIG. 2, the customized mobile content servicing apparatus 120 includes a communication interface unit 210, a sent data verifying unit 220, a mobile content generating unit 230, a content sending management unit 240, and a data managing unit 250. Herein, the data managing unit 250 includes a sent data DB 251, a user DB 252, a template DB 253, a metadata DB 254, a content history DB 255, a statistics DB 256, and an accounting DB 257.

The communication interface unit 210 receives the sent data from the content publishing server 110, and transmits the mobile content notification message and the mobile content to the user terminal 130. The communication interface unit 210 receives the sent data by using a TCP/IP socket based module, a web service based module, or a RESTFul based module (i.e., complying with REpresentational State Transfer (REST) constraints) among server/client modules.

The sent data verifying unit 220 verifies the type of the user terminal 130 from the sent data received through the communication interface unit 210 by using the prestored metadata. Specifically, the sent data verifying unit 220 decodes the sent data encrypted in the content sending server 110 by using a prestored key or an advanced encryption standard (AES), ARIA, or SEED algorithm after exchanging a key. ARIA is a block cipher cryptographic technique. The algorithm uses a substitution-permutation network structure based on AES. The interface is the same as AES: 128-bit block size with key size of 128, 192, or 256 bits. The number of rounds is 12, 14, or 16, depending on the key size. ARIA uses two 8×8-bit S-boxes and their inverses in alternate rounds; one of these is the Rijndael S-box.SEED is a 128-bit symmetric key block cipher that has been developed by the Korean Information Security Agency. The sent data verifying unit 220 verifies the type of the user terminal 130 through an application program interface of a communication network operating company to determine whether the mobile content can be serviced. The sent data verifying unit 220 manages the list of types of terminals capable of servicing the mobile content. An information material to be transmitted to the user and the user's destination information (for example, a telephone number or personal information) are included in the sent data.

The mobile content generating unit 230 generates the mobile content by using the prestored template according to the terminal type verified by the sent data verifying unit 220. Specifically, the mobile content generating unit 230 encrypts the mobile content by using the AES, ARIA, or SEED algorithm using a user's identification number (for example, last digits of a resident registration number) as the key. The mobile content generating unit 230 generates the mobile content by using templates and metadata for each of a plurality of content publishing institutions, which are stored in the template DB 253 and the metadata DB 254 in order to manage a SaaS based mobile content. The mobile content generating unit 230 generates the mobile content as an HTML file when the verified terminal type is the smart phone. The mobile content generating unit 230 generates the mobile content as an XML file when the verified terminal type is a feature phone. The mobile content generating unit 230 encrypts the generated mobile content by using the user's identification number (for example, the last digits of the resident registration number) as the key.

The content sending management unit 240 transmits the notification message of the mobile content generated by the mobile content generating unit 230 to the user terminal 130 and transmits the mobile content according to a request for downloading the mobile content from the user terminal 130. The content publishing institution inspects inquiry/verification of the mobile content through a web portal and the content sending management unit 240 receives a sending time of the inspected mobile content set from the content publishing institution.

The content sending management unit 240 transmits the mobile content notification message to the user terminal 130 as a push message or a short message service when the user terminal 130 is the smart phone. When the user terminal 130 is the feature phone, the content sending management unit 240 transmits the mobile content notification message to the user terminal 130 as a short message service including a call-back uniform resource locator (URL). When a virtual machine or an application is not installed in the user terminal 130 or is not the latest version, the content sending management unit 240 transmits a short message service including an application installation guide to the user terminal 130 or transmits the short message service including the call-back URL to the user terminal 130. When the user terminal 130 receives the short message service and selects reception of the mobile content, the content sending management unit 240 verifies whether a mobile content program (for example, the virtual machine) is installed and when the program is not installed, the mobile content program is installed in the user terminal 130. When the user terminal 130 is the smart phone, the content sending management unit 240 transmits a smart phone program installation guide message to the user terminal 130. The user receives the short message service and installs the smart phone program and thereafter, drives the program.

The data managing unit 250 stores and manages sent data, user information, a template, and metadata that are received in corresponding DBs, respectively. Specifically, the data managing unit 250 includes a sent data DB 251 storing the sent data, a user DB 252 storing the user information including the terminal type of the user terminal 130, a template DB 253 storing the template, a metadata DB 254 storing the metadata, a content history DB 255 storing content history data including at least one of a sending record of the notification message and a downloading record of the mobile content, a statistics DB 256 storing statistical data, and an accounting DB 257 storing accounting data. The data managing unit 250 verifies and manages whether the user receives the content (whether the user downloads the content), whether the user reads the content (whether the user firstly opens the corresponding content after downloading), whether the user verifies the content (how many taps or pages the user moves to when the content is divided for each page after opening the content), and whether the user links to the content (an inbound call, a mobile page, and purchase). The template may be set for each terminal type depending on a resolution as a design tool including at least one of a table, a label, and an image in order to generate the Software as a Service (SaaS) based content and configure a design and data. The metadata represents a file layout of the sent data defined by the content publishing institution.

The data managing unit 250 may store the mobile content in an authorized electronic document storage server in association with an authorized electronic document storage institution according to the importance of the mobile content or a request from the content publishing institution.

The data managing unit 250 provides the content history data regarding whether the user terminal 130 receives, reads, and verifies the content for the mobile content, and the statistics and accounting data for the mobile content to the content publishing institution through the web portal. The data managing unit 250 manages an inquiring/inspecting function of the content history data, and the statistics and accounting data according to user authority of the web portal.

Figure 3:
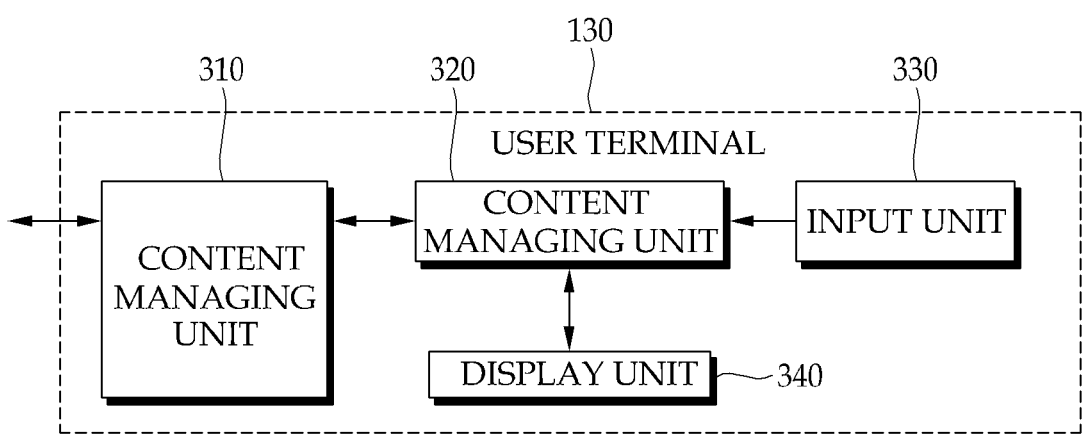
FIG. 3 is a configuration diagram of a user terminal of FIG. 1 according to an exemplary embodiment of the present disclosure.

FIG. 3 is a configuration diagram of a user terminal of FIG. 1 according to an exemplary embodiment of the present disclosure.

As shown in FIG. 3, the user terminal 130 includes a transmitting/receiving unit 310, a content managing unit 320, an input unit 330, and a display unit 340.

The transmitting/receiving unit 310 transmits the downloading request of the mobile content to the customized mobile content servicing apparatus 120. The transmitting/receiving unit 310 receives the mobile content notification message and the mobile content from the customized mobile content servicing apparatus 120.

The content managing unit 320 manages whether the mobile content program is installed and the version of the mobile content program. The content managing unit 320 requests downloading the mobile content through the mobile content program to the transmitting/receiving unit, and parses and manages the received mobile content for each classification system in response to the request. The content managing unit 320 parses an HTML or XML tag included in the mobile content by using a keeping box function depending on a prestored classification system.

The display unit 340 displays the mobile content parsed by the content managing unit 320 to the user.

The input unit 330 receives data inputted by the user.

Meanwhile, the content managing unit 320 may delete the mobile content in the temporal order among mobile contents stored in a memory and store a new mobile content when a mobile storage capacity of the memory provided therein is insufficient. The content managing unit 320 may store the received mobile content in the memory provided therein and inquire into the mobile content without communicating with the customized mobile content servicing apparatus 120 on the memory according to the request from the user. The content managing unit 320 may inquire into the mobile content even in an off-line state where the user terminal 130 is not connected to the Internet until the user deletes the stored content. The content managing unit 320 determines a failure in user authentication and decoding to receive an input again when numbers inputted by the user do not match the user's identification number (for example, the last digits of the resident registration number). In this case, the content managing unit 320 may stop inquiring into the mobile content when the failure occurs at the predetermined number of times or more.

The content managing unit 320 may provide a mobile payment service in association with a mobile payment server through a link in the mobile content when the mobile content is a charging content. For example, the content managing unit 320 may provide an account transfer or credit card payment in association with the mobile payment server through the link in the mobile content. The user may inquire into various pieces of information received from the mobile content through the content managing unit 320, pay a charging record by presenting a credit card, the account transfer, and a 2D barcode, use a coupon, or purchase products.

Figure 4:
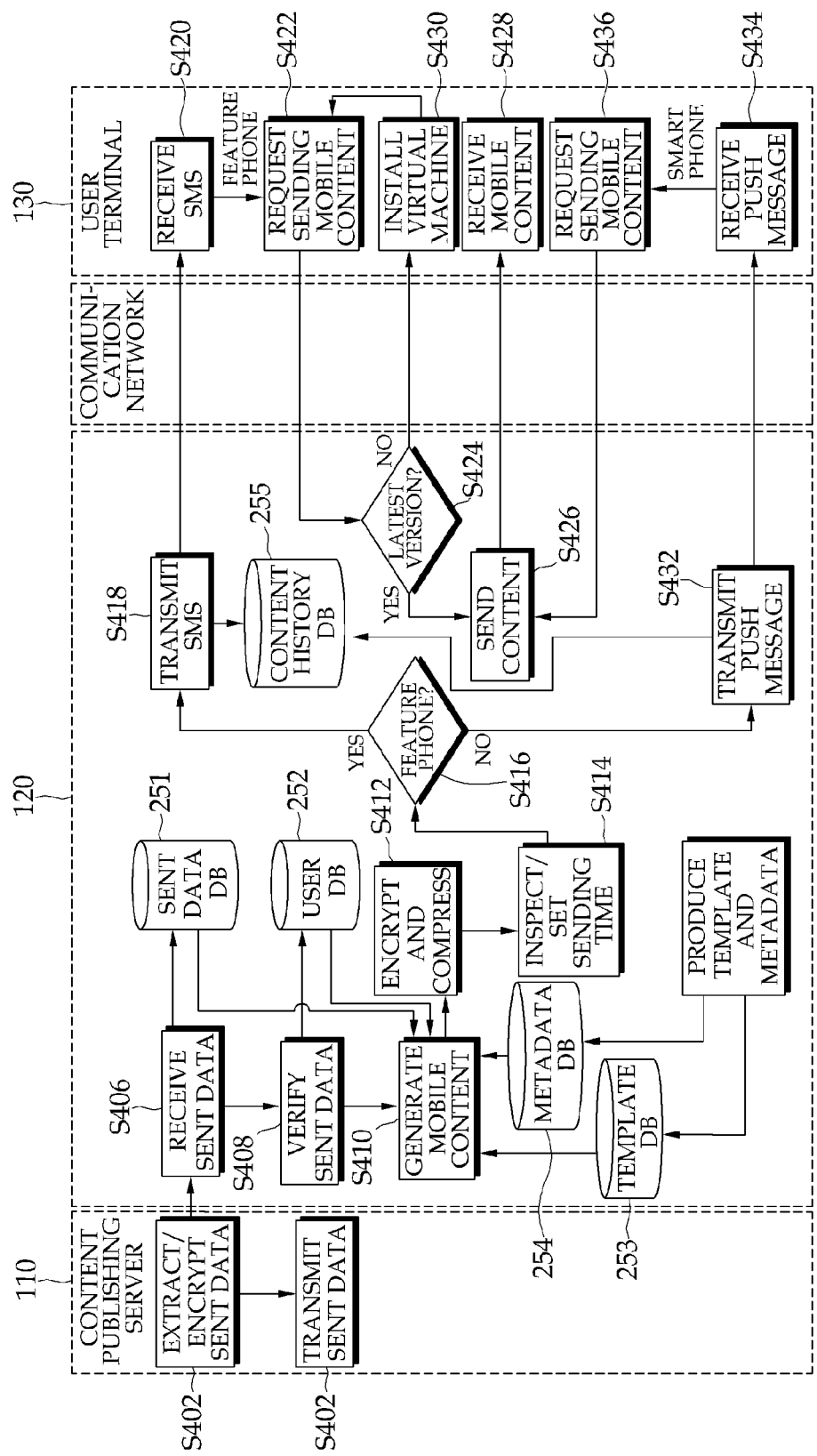
FIG. 4 is a flowchart of a method for servicing a customized mobile content according to an exemplary embodiment of the present disclosure.

FIG. 4 is a flowchart of a method for servicing a customized mobile content according to an exemplary embodiment of the present disclosure.

The customized mobile content servicing apparatus 120 generates a template for each user terminal type according to a content design consulted with the content publishing institution (for example, a company client and a governmental institution) and stores the generated template in the template DB 253, prior to sending the mobile content. Further, the customized mobile content servicing apparatus 120 generates metadata by using layout information of the sent data consulted with the content publishing institution and stores the generated metadata in the metadata DB 254.

Thereafter, the content publishing server 110 extracts sent data to be sent among all of the content data and encrypts the extracted sent data (S402). Herein, the content data means all data which companies and governmental institutions (local autonomous entities) send for the purposes of advertising, marketing, promotion, informing/notification, and identification of members.

The content publishing server 110 transmits the encrypted sent data to the customized mobile content servicing apparatus 120 (S404).

Meanwhile, the communication interface unit 210 of the customized mobile content servicing apparatus 120 receives the encrypted sent data from the content publishing server 110 (S406). The received sent data is stored in the sent data DB 251.

The sent data verifying unit 220 decodes the encrypted sent data, parses the decoded data by using the metadata stored in the metadata DB 254, and verifies whether the mobile content can be serviced the user terminal type by using the telephone number of the user terminal 130 according to the parsing result (S408). The sent data verifying unit 220 verifies whether the terminal type is the feature phone or the smart phone.

The mobile content generating unit 230 generates the mobile content acquired by encrypting the decoded sent data according to the terminal type and the template (S410). For example, the mobile content generating unit 230 may generate the mobile content by encrypting the last digits of the user's resident registration number.

The content sending management unit 240 requests inquiring into and inspecting the mobile content to the content publishing server 110 and receives a set sending time (S414).

The content sending management unit 240 receives whether the terminal type of the user terminal 130 verified by the sent data verifying unit 220 is the feature phone (S416).

According to the verification result (S416), when the terminal type of the user terminal 130 is the feature phone, the content sending management unit 240 transmits a short message service (SMS) for notifying that there is a mobile content which the user terminal 130 will receive, to the user terminal 130 through the communication interface unit 210 (S418).

Meanwhile, the user terminal 130 receives the SMS for notifying that there is the mobile content to be received through the communication network (S420).

The user terminal 130 requests sending the mobile content to the customized mobile content servicing apparatus 120 according to the request from the user (S422).

The content sending management unit 240 verifies whether the virtual machine installed in the user terminal 130 is the latest version (S424).

According to the verification result (S424), when the virtual machine is the latest version, the content sending management unit 240 sends the mobile content to the user terminal 130 (S426). Subsequently, the user terminal 130 receives the mobile content (S428).

On the contrary, according to the verification result (S424), when the virtual machine of the user terminal 130 is not the latest version or is not installed, the user terminal 130 downloads and installs the latest-version virtual machine (S430). The user terminal 130 performs the process from "S422" of requesting transmitting the mobile content.

Meanwhile, according to the verification result (S416), when the terminal type of the user terminal 130 is the smart phone, the content sending management unit 240 transmits a push message for notifying that there is the mobile content which the user terminal 130 will receive, to the user terminal 130 through the communication interface unit 210.

The user terminal 130 receives the push message for notifying that there is the mobile content to be received (S434).

The user terminal 130 requests sending the mobile content to the customized mobile content servicing apparatus 120 according to the request from the user (S436). The content sending management unit 240 performs the process from "S426" of sending the mobile content.

Figure 5:
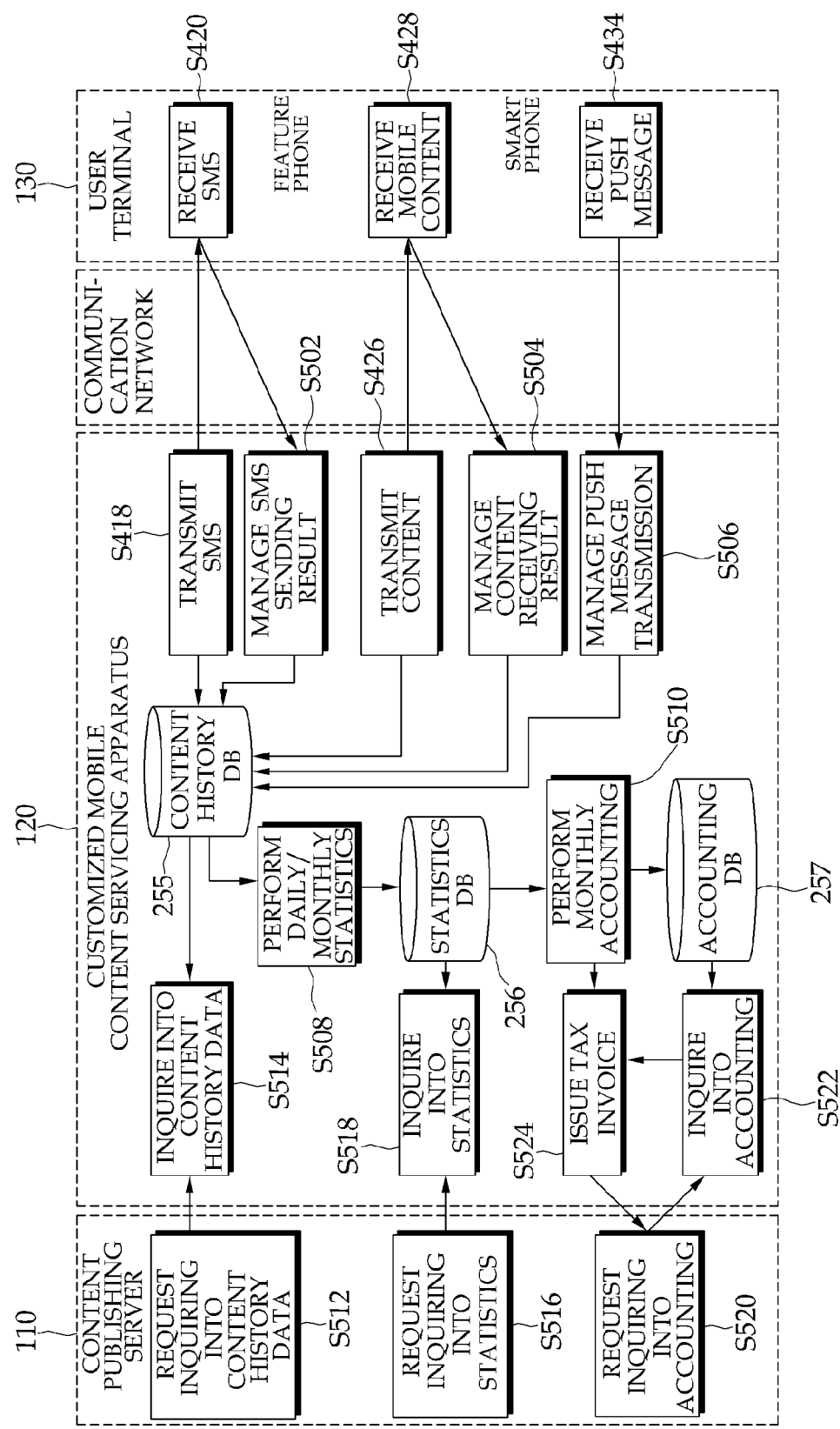
FIG. 5 is a flowchart of a method for inquiring into data regarding history, statistics, and accounting of contents according to an exemplary embodiment of the present disclosure.

FIG. 5 is a flowchart of a method for inquiring into data regarding history, statistics, and accounting of contents according to an exemplary embodiment of the present disclosure.

The data managing unit 250 receives content history data (for example, an SMS sending result, a mobile content receiving result, and a push message receiving result) and stores the received data in the content history DB 255.

Specifically, when the SMS is received from the user terminal 130, the data managing unit 250 receives the SMS sending result from the user terminal 130 and stores the received result in the content history DB 255 (S502).

When the mobile content is received from the user terminal 130, the data managing unit 250 receives the mobile content receiving result from the user terminal 130 and stores the received result in the content history DB 255 (S504).

When the push message is received from the user terminal 130, the data managing unit 250 receives the push message receiving result from the user terminal 130 and stores the received result in the content history DB 255 (S506).

Meanwhile, the data managing unit 250 stores the statistical data in the statistics DB 256 by performing daily/monthly statistics by using the content history data stored during the processes of "S502" to "S506" (S508).

The data managing unit 250 stores the accounting data in the accounting DB 257 by performing monthly accounting by using the statistical data (S510).

Meanwhile, the content publishing server 110 requests inquiring into the content history data to the data managing unit 250 according to a request from an operator (S512).

The data managing unit 250 inquires into the requested content history data from the content history DB 255 and transmits the corresponding data to the content publishing server 110 (S514).

Meanwhile, the content publishing server 110 requests inquiring into the statistics to the data managing unit 250 according to the request from the operator (S516).

The data managing unit 250 inquires into the requested statistical data from the statistics DB 256 and transmits the corresponding data to the content publishing server 110 (S518).

Meanwhile, the content publishing server 110 requests inquiring into the accounting to the data managing unit 250 according to the request from the operator (S520).

The data managing unit 250 inquires into the requested accounting data from the accounting DB 257 (S522), and publishes a tax invoice from the inquiry result and transmits the published tax invoice to the content publishing server 110 (S524).

Figure 6:
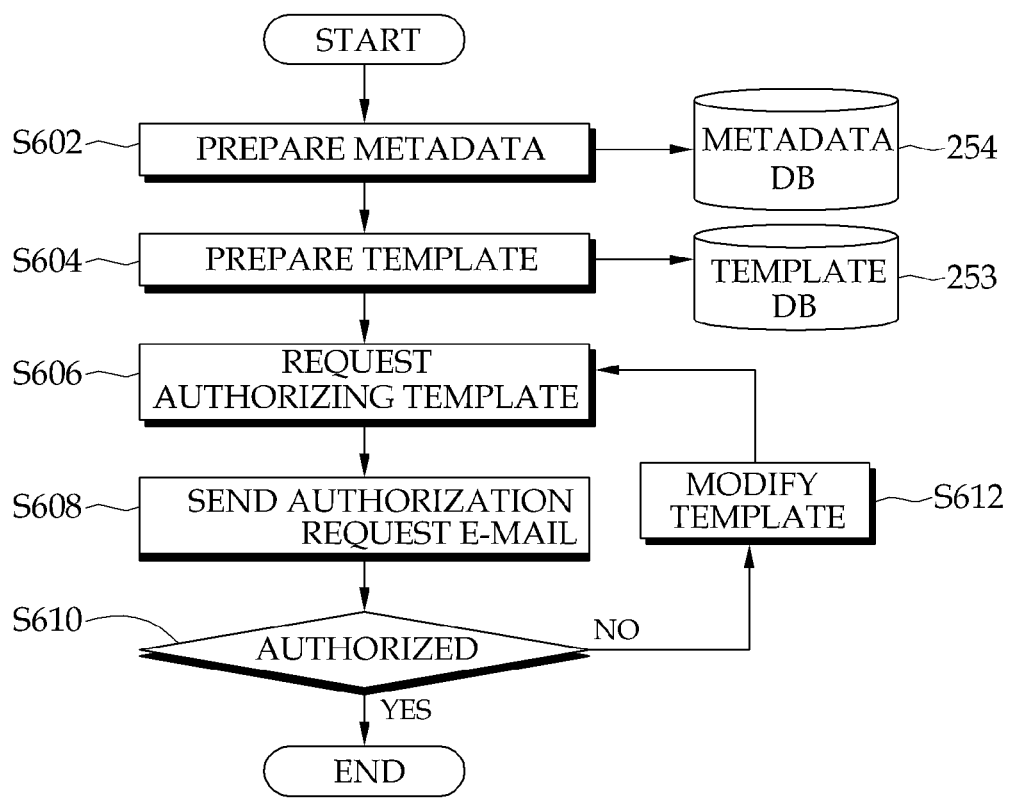
FIG. 6 is a flowchart of a method for producing metadata and a template for a mobile content according to an exemplary embodiment of the present disclosure.

FIG. 6 is a flowchart of a method for producing metadata and a template for a mobile content according to an exemplary embodiment of the present disclosure.

The data managing unit 250 receives a content design for each predetermined resolution from the content publishing server 110.

The data managing unit 250 verifies sent data information required for the corresponding content and receives a file layout from the content publishing server 110.

The data managing unit 250 receives data matching information between the sent data and the content design from the content publishing server 110.

Thereafter, the data managing unit 250 prepares the metadata according to the file layout received from the content publishing server 110 and stores the prepared metadata in the metadata DB 254 (S602).

The data managing unit 250 prepares a template for each resolution according to the content design and the matching information received from the content publishing server 110 and stores the prepared template in the template DB 253 (S604). Design tools are provided to facilitate the generation and design of the SaaS based content, and data configuration through the template.

The data managing unit 250 receives a request for authorizing the template through the web portal from the operator (S606).

The data managing unit 250 transmits an authorization request e-mail to the content publishing server 110 (S608).

The data managing unit 250 verifies whether the template is authorized (S610).

According to the verification result (S610), when the template is authorized, the data managing unit 250 terminates the generation processes of the metadata and the template. On the contrary, when the template is not authorized, the data managing unit 250 modifies the template by reflecting a reason for an authorization rejection (modification request) from the content publishing server 110 (S612). Subsequently, the data managing unit 250 performs the process from "S606" again.

The processes of "S602" to "S610" are performed before the customized mobile content service starts and may be performed when the content design or the received file layout is changed due to the request from the content publishing institution while operating the service.

Figure 7:
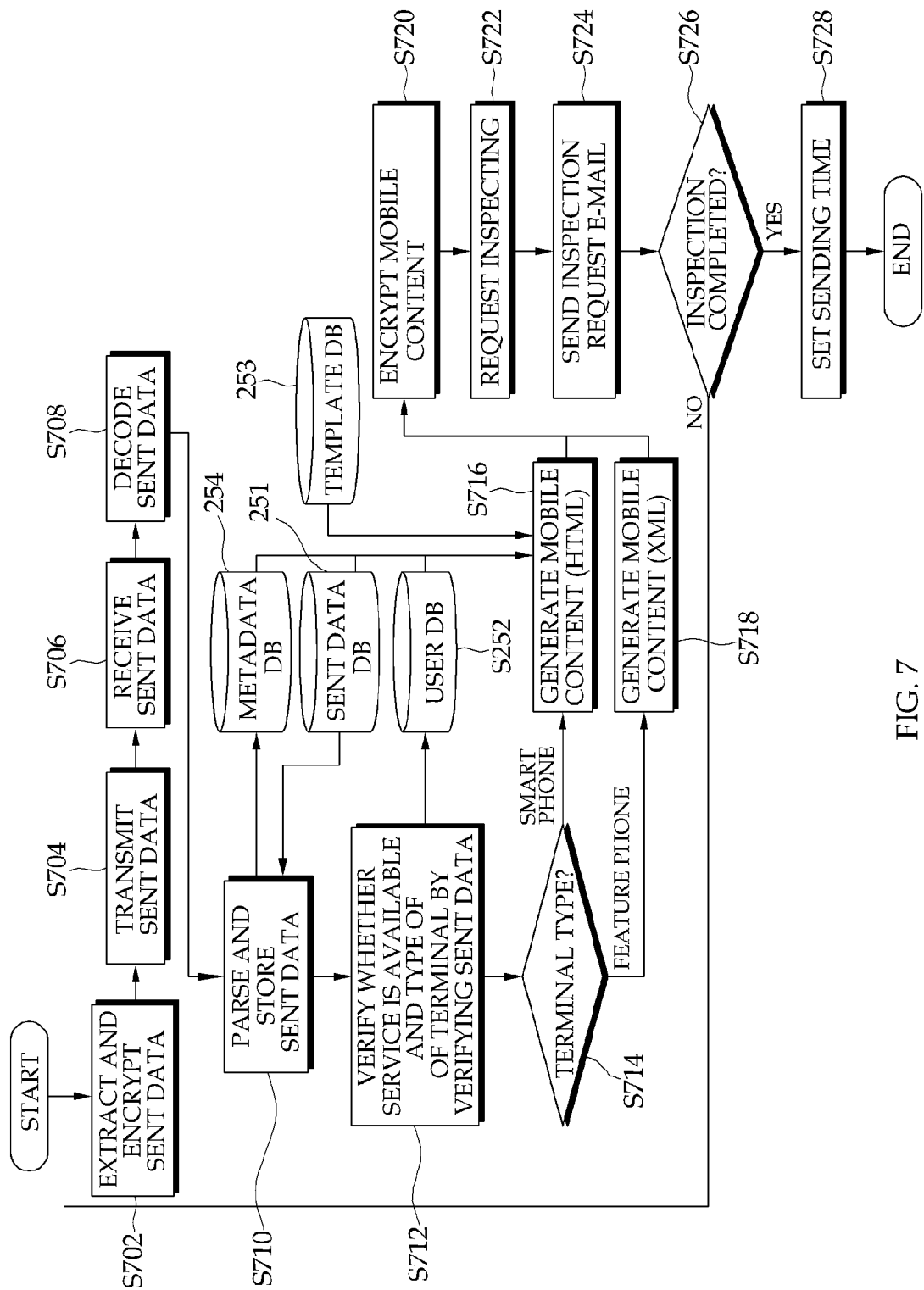
FIG. 7 is a flowchart of a method for generating a mobile content according to an exemplary embodiment of the present disclosure.

FIG. 7 is a flowchart of a method for generating a mobile content according to an exemplary embodiment of the present disclosure.

The content publishing server 110 extracts sent data to be sent among all of the content data and encrypts the extracted sent data (S702).

The content publishing server 110 transmits the encrypted sent data to the customized mobile content servicing apparatus 120 (S704).

Meanwhile, the communication interface unit 210 of the customized mobile content servicing apparatus 120 receives the encrypted sent data from the content publishing server 110 (S706).

The sent data verifying unit 220 decodes the encrypted sent data (S708).

The sent data verifying unit 220 parses the sent data by using metadata previously stored in the metadata DB 254 and stores the parsing result in the sent data DB 251 (S710).

The sent data verifying unit 220 verifies whether the mobile content can be serviced and a terminal type from the sent data and stores whether the mobile content can be serviced and the terminal type in the user DB 252 (S712).

The sent data verifying unit 220 verifies whether the terminal type is the feature phone or the smart phone (S714).

According to the verification result (S714), when the terminal type is the smart phone, the mobile content generating unit 230 generates the mobile content in an HTML format (S716). On the contrary, when the terminal type is the feature phone, the mobile content generating unit 230 generates the mobile content in an XML format (S718).

The mobile content generating unit 230 encrypts the mobile content generated in the process of "S716" or "S718" (S720).

The content sending management unit 240 requests inspecting the mobile content to the content publishing server 110 (S722).

The content sending management unit 240 sends an inspection request e-mail (S724).

The content sending management unit 240 verifies whether the inspection of the mobile content is completed (S726).

According to the verification result (S726), when the inspection is completed, the content sending management unit 240 receives a set sending time (S728). On the contrary, when the inspection is not completed, the content sending management unit 240 performs the process from "S702" again.

Figure 8:
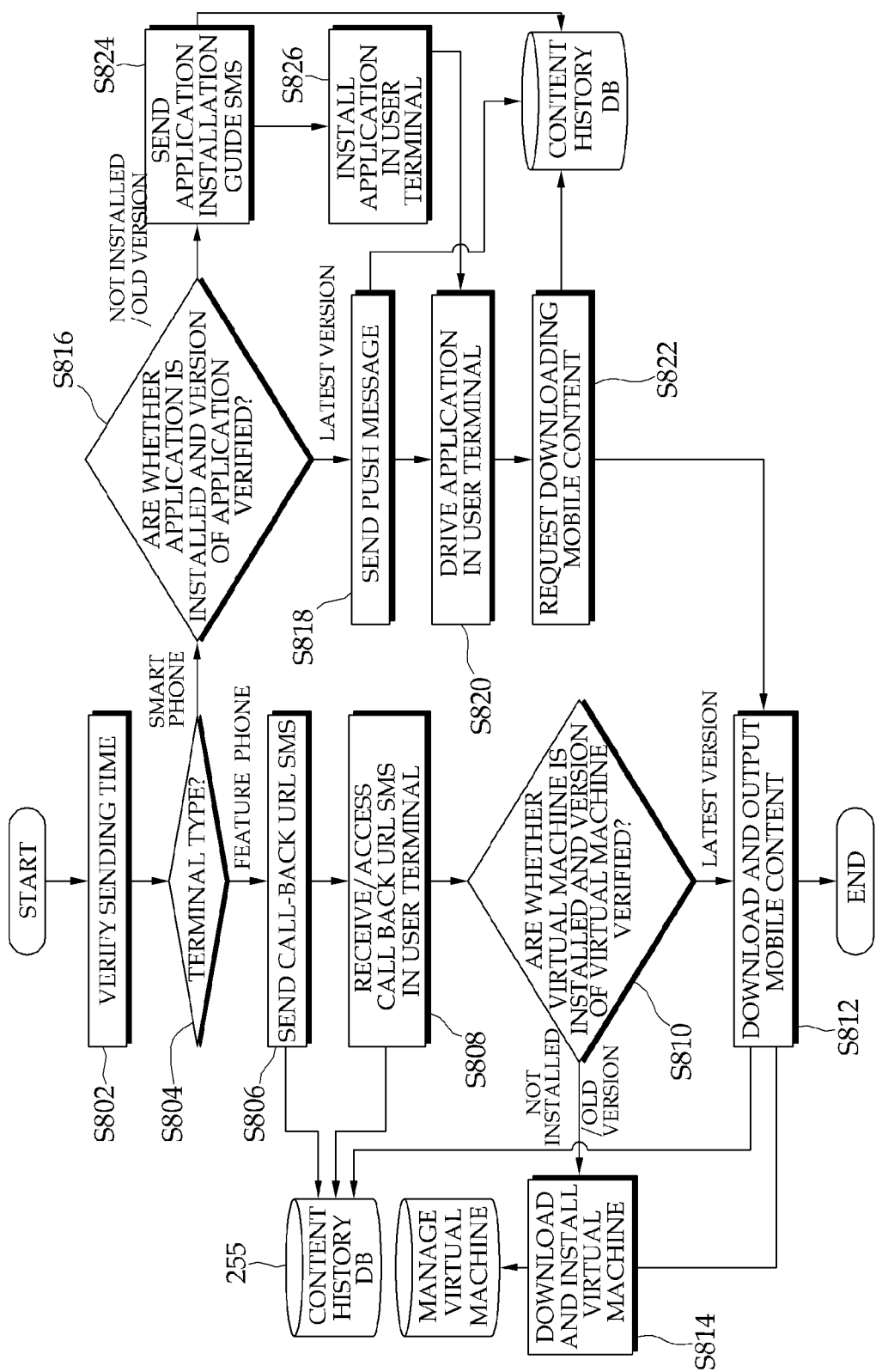
FIG. 8 is a flowchart of a method for downloading a mobile content according to an exemplary embodiment of the present disclosure.

FIG. 8 is a flowchart of a method for downloading a mobile content according to an exemplary embodiment of the present disclosure.

The content sending management unit 240 verifies the sending time (S802).

The content sending management unit 240 verifies whether the terminal type verified by the sent data verifying unit 220 is the smart phone or the feature phone (S804).

According to the verification result (S804), when the terminal type is the feature phone, the short message service (SMS) including the call-back URL is sent to the user terminal 130 (S806). Herein, the call-back URL means an address to which the user terminal 130 requests sending the mobile content. A sending record of the short message service (SMS) including the call-back URL is stored in the content history DB 255.

The user terminal 130 receives the short message service (SMS) including the call-back URL and accesses the customized mobile content servicing apparatus 120 with the call-back URL (S808). A receiving record of the short message service (SMS) including the call-back URL is stored in the content history DB 255.

The content sending management unit 240 verifies whether the virtual machine is installed in the user terminal 130 and the version of the virtual machine (S810).

According to the verification result (S810), when the virtual machine is installed and the version of the virtual machine is the latest version, the user terminal 130 downloads the mobile content from the customized mobile content servicing apparatus 120 through the communication network and outputs the downloaded mobile content to the user (S812). A downloading record and an outputting record of the mobile content are stored in the content history DB 255.

According to the verification result (S810), when the virtual machine is not installed or the version of the virtual machine is not the latest version, the user terminal 130 downloads the latest-version virtual machine from the content sending management unit 240 and installs the virtual machine.

The user terminal 130 performs the process of "S812" of downloading and displaying the mobile content.

Meanwhile, according to the verification result (S804), when the terminal type is the smart phone, the content sending management unit 240 verifies whether the application is installed in the user terminal 130 and the version of the application (S816).

According to the verification result (S816), when the application is installed and the version of the application is the latest version, the content sending management unit 240 sends the push message for notifying the mobile content to be downloaded (S818). A sending record of the push message is stored in the content history DB 255.

The user terminal 130 drives the application (S820).

The user terminal 130 requests downloading the mobile content through the driven application (S822). Herein, a downloading record of the mobile content is stored in the content history DB 255.

The user terminal 130 performs the process of "S812" of downloading and displaying the mobile content.

Meanwhile, according to the verification result (S816), when the application is not installed or the version of the application is not the latest version, the content sending management unit 240 sends the short message service (SMS) including the application installation guide to the user terminal 130 (S824). A sending record of the short message service including the application installation guide is stored in the content history DB 255.

The user terminal 130 installs the application according to the application installation guide (S826). The user terminal 130 performs the process from "S820".

Figure 9:
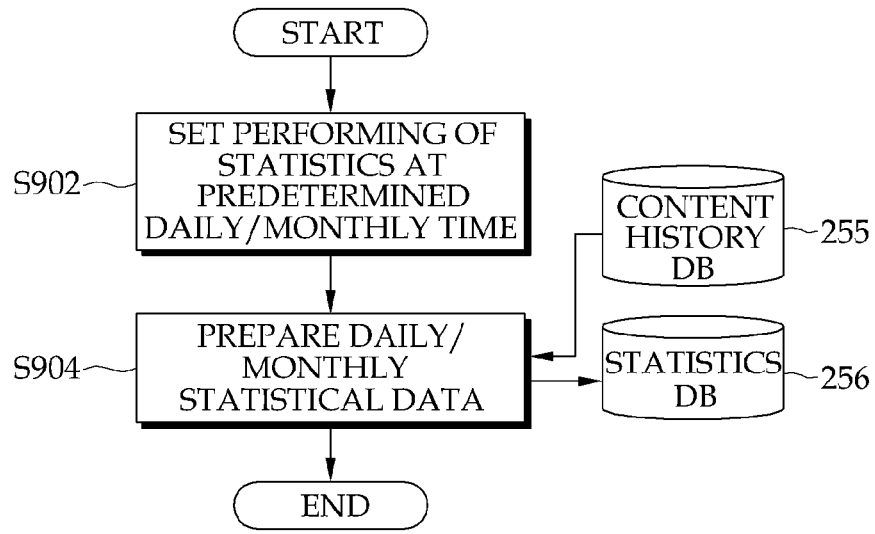
FIGS. 9 and 10 are flowcharts of a statistics/accounting management method in an apparatus for servicing a customized mobile content according to an exemplary embodiment of the present disclosure.
Figure 10:
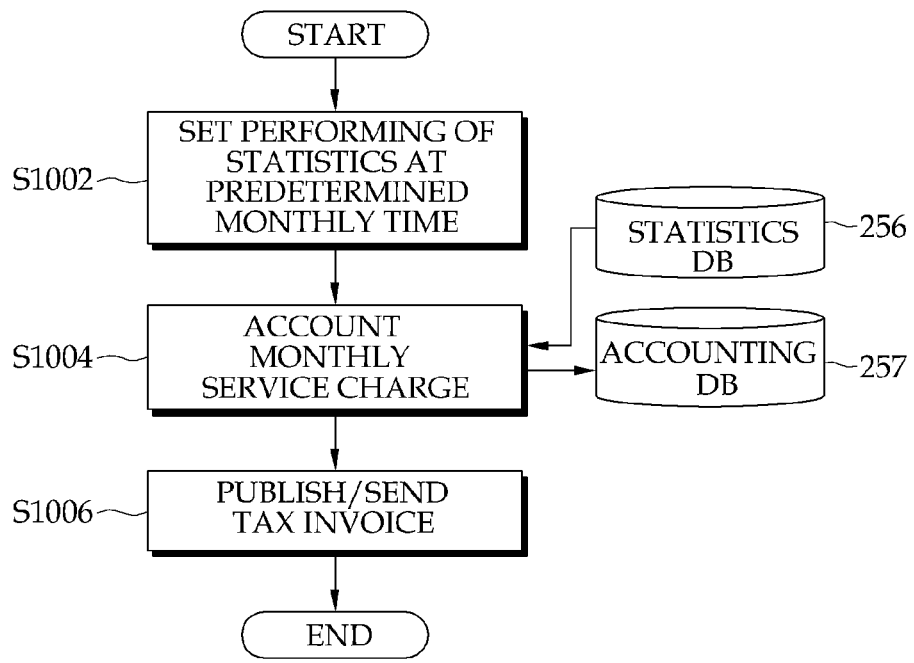

FIGS. 9 and 10 are flowcharts of a statistics/accounting management method in an apparatus for servicing a customized mobile content according to an exemplary embodiment of the present disclosure.

As shown in FIG. 9, the data managing unit 250 sets the performing of the statistics at a predetermined daily/monthly time according to the request from the operator (S902).

The data managing unit 250 takes the content history data from the content history DB 255 at the set predetermined daily/monthly time, and calculates daily/monthly statistical data and stores the calculated statistical data in the statistics DB 256 (S904).

As shown in FIG. 10, the data managing unit 250 sets the performing of the accounting at the predetermined monthly time according to the request from the operator (S1002).

The data managing unit 250 takes the statistical data from the statistics DB 256 at the set predetermined monthly time, and accounts a monthly service charge and stores the accounting data in the accounting DB 257 (S1004).

The data managing unit 250 may publish the tax invoice by using the accounting data for the monthly service charge and send the tax invoice to the content publishing server 110 (S1006).

Figure 11:
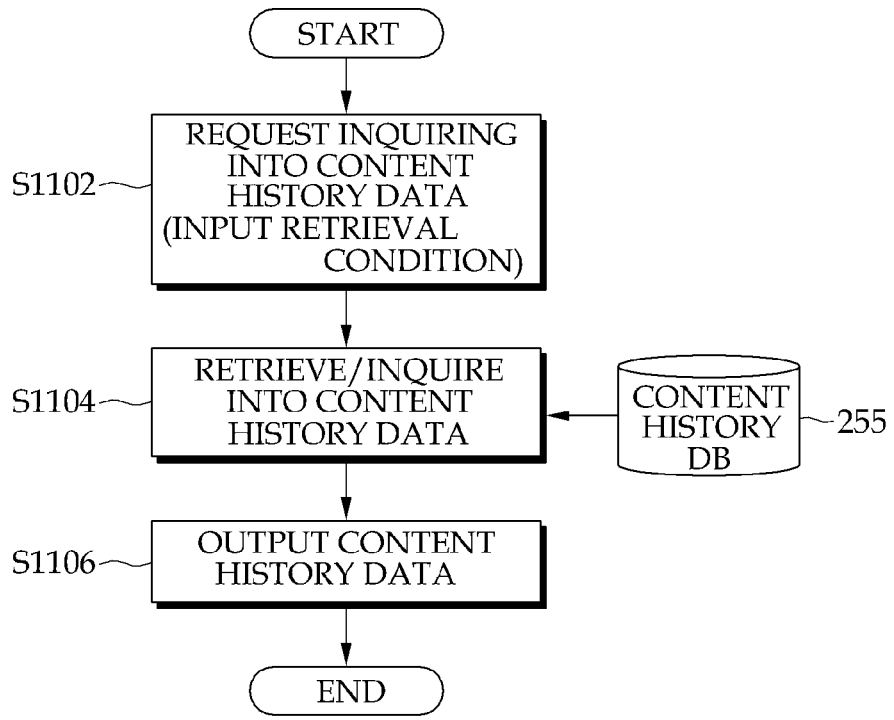
FIGS. 11 to 13 are flowcharts of a method for inquiring into history data, accounting data, and statistical data of contents in an apparatus for servicing a customized mobile content according to an exemplary embodiment of the present disclosure.
Figure 12:
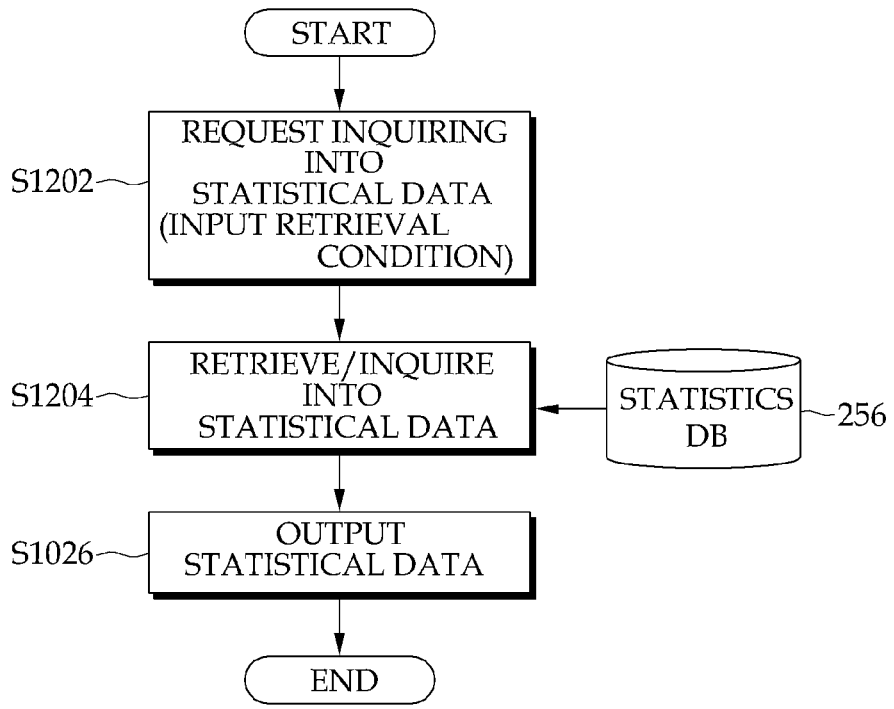
Figure 13:
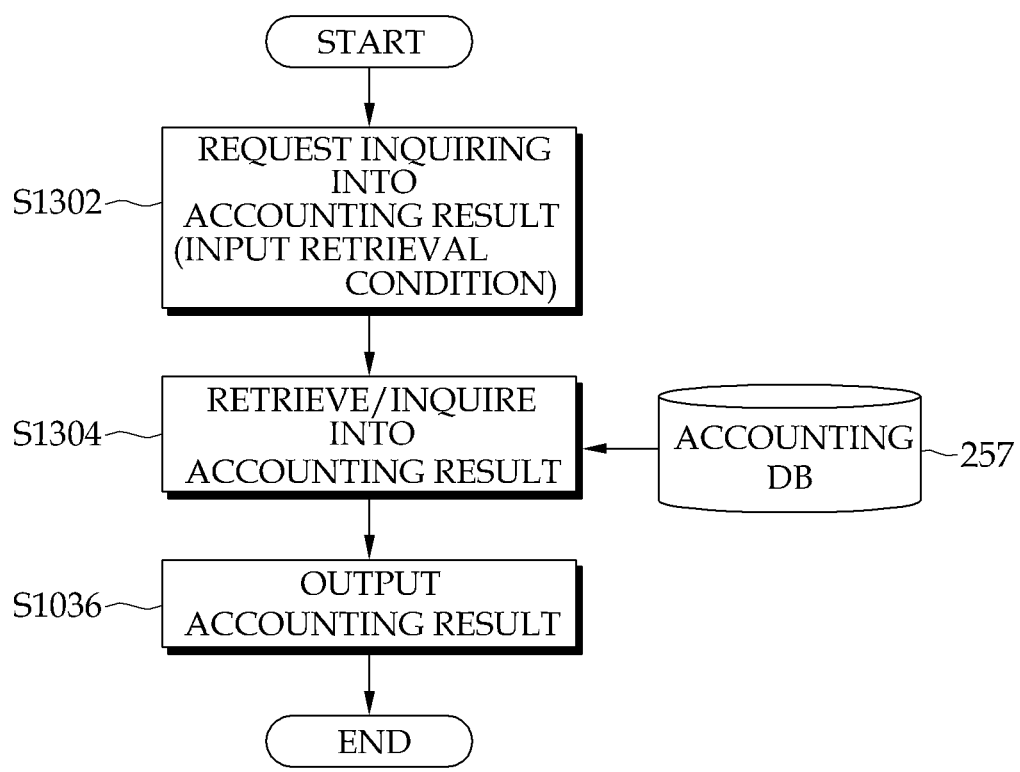

FIGS. 11 to 13 are flowcharts of a method for inquiring into history data, accounting data, and statistical data of contents in an apparatus for servicing a customized mobile content according to an exemplary embodiment of the present disclosure.

As shown in FIG. 11, the method of inquiring into the content history data will be described.

The content publishing server 110 inputs a retrieval condition in the customized mobile content servicing apparatus 120 to request inquiring into the content history data (S1102).

The data managing unit 250 retrieves and inquires into the requested content history data from the content history DB 255 (S1104).

The data managing unit 250 outputs the retrieved/inquired content history data to the content publishing server 110 (S1106).

As shown in FIG. 12, the method of inquiring into the statistical data will be described.

The content publishing server 110 inputs the retrieval condition in the customized mobile content servicing apparatus 120 to request inquiring into the statistical data (S1202).

The data managing unit 250 retrieves and inquires into the requested statistical data from the content history DB 255 (S1204).

The data managing unit 250 outputs the retrieved/inquired statistical data to the content publishing server 110 (S1206).

As shown in FIG. 13, the method of inquiring into the accounting data will be described.

The content publishing server 110 inputs the retrieval condition in the customized mobile content servicing apparatus 120 to request inquiring into the accounting data (S1302).

The data managing unit 250 retrieves and inquires into the requested accounting data from the content history DB 255 (S1304).

The data managing unit 250 outputs the retrieved/inquired accounting data to the content publishing server 110 (S1306).

Meanwhile, the method for servicing the customized mobile content is implemented by a software program and recorded in a predetermined computer-readable recording medium to be applied to various reproducing apparatuses.

Various reproducing apparatuses may be a mobile terminal, a PDA, a notebook, a navigation, a PMP, a smart phone, an electronic dictionary, and an MPS as the above-mentioned user terminals.

For example, the recording medium may be a hard disk, a flash memory, a RAM, and a ROM which are embedded in each reproducing apparatus or may be an optical disk such as a CD-R or a CD-RW, a compact flash card, smart media, a memory stick, and a multimedia card which are installed outside each reproducing apparatus.

In this case, the program recorded in the computer-readable recording medium can be executed through a sent data receiving process of receiving sent data from a content publishing server, a sent data verifying process of verifying a terminal type of a user terminal by using prestored metadata from the received sent data, a mobile content generating process of generating a mobile content by using a prestored template according to the verified terminal type, a notification message transmitting process of transmitting a notification message of the generated mobile content to the user terminal, and a mobile content sending process of transmitting the mobile content according to a request for downloading the mobile content from the user terminal.

Meanwhile, the program recorded in the computer-readable recording medium can be executed through a program verifying process of verifying whether a program for the mobile content is installed and the version of the program, a download requesting process of requesting downloading the mobile content through the verified mobile content program, a mobile content receiving process of receiving and decoding the mobile content in response to the request, a content parsing process of parsing the decoded mobile content for each prestored classification system, and a displaying process of displaying the parsed mobile content to a user.

According to exemplary embodiments of the present disclosure, a user can easily download and use various mobile contents regardless of a type of his/her own terminal by verifying user information by using metadata and a template that are stored in advance from an information material published by a content publishing institution, generating a mobile content suitable for types of the content publishing institution and a user terminal and transmitting the generated mobile content to the user terminal, downloading the mobile content through a program for the mobile content installed in the user terminal and displaying the downloaded mobile content to the user. Therefore, with the superpassing of the limit of the existing technology, related technologies are not only used but a possibility of marketing or business of apparatuses to which the present disclosure is applied is sufficient and the present disclosure can be implemented actually clear, and as a result, the present disclosure has industrial applicability.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for servicing a customized mobile content, comprising:
   at least one processor and memory; and
   a set of instructions that cause the at least one processor to perform the following:
      receive data from a content publishing server, wherein the data is previously transmitted to the content publishing server by a user terminal, wherein the received data comprises metadata and at least one template, and wherein the metadata and the at least one template comprise a content design for a resolution and a file layout;

store the received data in at least one database of the apparatus;

decrypt encrypted data of the received data;

parse the set of decrypted data of the received data using the stored metadata;

verify a terminal type of the user terminal and whether mobile content can be serviced based on the terminal type and the stored metadata from the received data using an application program interface of a communication network operating company to determine whether the type of user terminal matches a user terminal on a list of types of terminals capable of servicing the mobile content;

select a template of the at least one stored templates according to the verified terminal type of the user terminal;

generate a mobile content based on the received data using the selected template of the at least one stored templates, wherein the selected template is a design tool that matches a resolution of the verified terminal type and includes at least one design element selected from the group consisting of: a table, a label, and an image;

transmit an authorization request for the mobile content to the content publishing server;

receive an authorization response through a web portal from the content publishing server, the authorization response comprising a sending time of the mobile content from the content publishing server;

modify the mobile content in response to a denied request from the content publishing server to authorize the template, wherein the template comprises information materials published by a content publishing institution;

transmit a generated notification message of the mobile content to the user terminal;

receive and process a request, in response to the transmitted generated notification, to download the mobile content from the user terminal; and transmit the mobile content to the user terminal in response to the request to download the mobile content from the user terminal, the request to download being in reply to the notification.

2. The apparatus of claim 1, the set of instructions further causing the at least one processor to:

store the received data;

store user information including the terminal type of the user terminal;

store the template;

store the metadata;

store content history data including at least one of a sending record of the notification message and a downloading record of the mobile content;

store statistical data for a history of the mobile content; and store accounting data for the history of the mobile content.

3. The apparatus of claim 1, wherein the data is information data which a content publishing institution sends associated with at least one of: advertising, marketing, promotion, informing/notification, or identification of member.

4. The apparatus of claim 1, wherein the template is settable, for each terminal type depending on a resolution, as a design tool including at least one of a table, a label, and an image in order to generate a Software as a Service (SaaS) based content and configure a design and data.

5. The apparatus of claim 1, the set of instructions further causing the at least one processor to receive the data by using a TCP/IP socket based module, a web service based module, or a RESTFul based module among server/client modules.

6. The apparatus of claim 1, the set of instructions further causing the at least one processor to decode the data encrypted in the content sending server by using a prestored key or an advanced encryption standard (AES), ARIA, or SEED algorithm after exchanging a key.

7. The apparatus of claim 1, the set of instructions further causing the at least one processor to encrypt the mobile content using at least one of: an AES, an ARIA, and an SEED algorithm, wherein the encryption uses an identification number of a user as an encryption key.

8. The apparatus of claim 1, the set of instructions further causing the at least one processor to generate the mobile content by using templates and metadata for each of a plurality of content publishing institutions, which are prestored in order to manage a SaaS based mobile content.

9. The apparatus of claim 1, the set of instructions further causing the at least one processor to generate the mobile content as an HTML file in the case that the verified terminal type is a smart phone, and to generate the mobile content as an XML file in the case that the verified terminal type is a feature phone, and to encrypt the generated mobile content by using an identification number of the user as a key.

10. The apparatus of claim 1, the set of instructions further causing the at least one processor to transmit the mobile content notification message to the user terminal as a push message or a short message service in the case that the user terminal is the smart phone, and in the case that the user terminal is the feature phone, the set of instructions causing the at least one processor to transmit the mobile content notification message to the user terminal as a short message service comprising a call-back uniform resource locator (URL).

11. The apparatus of claim 10, the set of instructions further causing the at least one processor to transmit a short message service including an application installation guide to the user terminal or to transmit the short message service comprising the call-back URL to the user terminal in the case that a virtual machine or an application is not installed in the user terminal or is not the latest version.

12. The apparatus of claim 1, the set of instructions further causing the at least one processor to store the generated mobile content in an authorized electronic document storage server in association with an authorized electronic document storage institution according to importance of the generated mobile content or a request from the content publishing institution.

13. The apparatus of claim 1, the set of instructions further causing the at least one processor to provide content history data regarding whether the user terminal receives, reads, and verifies the content for the mobile content, and statistics and accounting data for the mobile content to a content publishing institution through a web portal, and to provide the content history data, and the statistics and accounting data to the content publishing institution according to user authority of the web portal.

14. A method for servicing a customized mobile content in a customized mobile content servicing apparatus, comprising:

receiving data from a content publishing server, wherein the data is previously transmitted to the content publishing server by a user terminal, wherein the received data comprises metadata and at least one template, and wherein the metadata and the at least one template comprises a content design for a resolution and a file layout;

storing the received data in at least one database of the apparatus;

decrypting encrypted data of the received data;

parsing the set of decrypted data of the received data using the stored metadata;

verifying a terminal type of the user terminal and whether mobile content can be serviced based on the terminal type and the stored metadata from the received data using an application program interface of a communication network operating company to determine whether the type of user terminal matches a user terminal on a list of types of terminals capable of servicing the mobile content;

selecting a template of the at least one stored templates according to the verified terminal type of the user terminal;

generating a mobile content based on the received data using the selected template of the at least one stored templates, wherein the selected template is a design tool that matches a resolution of the verified terminal type and includes at least one design element selected from the group consisting of: a table, a label, and an image;

transmit an authorization request for the mobile content to the content publishing server;

receive an authorization response through a web portal from the content publishing server, the authorization response comprising a sending time of the mobile content from the content publishing server;

modifying the mobile content in response to a denied request from the content publishing server to authorize the template, wherein the template comprises information materials published by a content publishing institution;

transmitting a notification message of the generated mobile content to the user terminal;

receiving and processing a request, in response to the transmitted generated notification, to download the mobile content from the user terminal; and transmitting the mobile content to the user terminal in response to the request to download the mobile content from the user terminal, the request to download being in reply to the notification.

15. The method of claim 14, wherein the data is received by using a TCP/IP socket based module, a web service based module, or a RESTFul based module among server/client modules.

16. The method of claim 14, wherein the data is encrypted in content sending server and is decoded by using a pre-stored key or an advanced encryption standard (AES), ARIA, or SEED algorithm after exchanging a key.

17. The method of claim 14, wherein the mobile content is encrypted by using an AES, ARIA, or SEED algorithm using an identification number of the user as an encryption key.

18. The method of claim 14, wherein the mobile content is generated by using templates and metadata for each of a plurality of content publishing institutions which are pre-stored in order to manage a SaaS based mobile content.

19. The method of claim 14, wherein the mobile content is generated as an HTML file in the case that the verified terminal type is a smart phone, and the mobile content is generated as an XML file in the case that the verified terminal type is a feature phone, and the generated mobile content is encrypted by using an identification number of the user as a key.

20. The method of claim 14, wherein the mobile content notification message is transmitted to the user terminal as a push message or a short message service in the case that the user terminal is a smart phone, and in the case that the user terminal is a feature phone, the mobile content notification message is transmitted to the user terminal as a short message service comprising a call-back uniform resource locator (URL).

21. The method of claim 20, wherein a short message service including an application installation guide is transmitted to the user terminal or the short message service comprising the call-back URL is transmitted to the user terminal, in the case that a virtual machine or an application is not installed in the user terminal or is not the latest version.

* * * * *